United States Patent [19]

Visser

[11] 4,073,710
[45] Feb. 14, 1978

[54] METHOD OF MACHINING ELECTRICALLY CONDUCTING SUBSTANCES BY ELECTROCHEMICAL ATTACK

[75] Inventor: Kommer Visser, Amsterdam-Bijlmermeer, Netherlands

[73] Assignee: Ultra Centrifuge Nederland N.V., The Hague, Netherlands

[21] Appl. No.: 705,174

[22] Filed: July 14, 1976

[30] Foreign Application Priority Data

Aug. 11, 1975 Netherlands .................. 7509529

[51] Int. Cl.² .......................... C25F 3/00; C25F 3/02; C25D 17/12
[52] U.S. Cl. ..................... 204/129.65; 204/129.75; 204/DIG. 9; 204/224 M
[58] Field of Search ............... 204/129.43, DIG. 9, 204/224 M, 224 R, 129.75

[56] References Cited

U.S. PATENT DOCUMENTS

| 3,532,616 | 10/1970 | Garnett | 204/224 R |
| 3,562,132 | 2/1971 | Godbehere | 204/224 R |
| 3,718,555 | 2/1973 | Darling et al. | 204/129.75 |
| 3,748,239 | 7/1973 | De Lavalette | 204/129.43 X |

FOREIGN PATENT DOCUMENTS

| 43-1377 | 1/1968 | Japan | 204/224 R |
| 1,209,170 | 10/1970 | United Kingdom | 204/224 R |

Primary Examiner—John H. Mack
Assistant Examiner—D. R. Valentine
Attorney, Agent, or Firm—Cushman, Darby & Cushman

[57] ABSTRACT

A method for etching fine grooves in surfaces by the combination of pulsed currents in a modified E.C.M. (Electro Chemical Machining) method in combination with a flow guiding template.

The method is very suitable for the etching of grooves in a surface used in a bearing.

7 Claims, 1 Drawing Figure

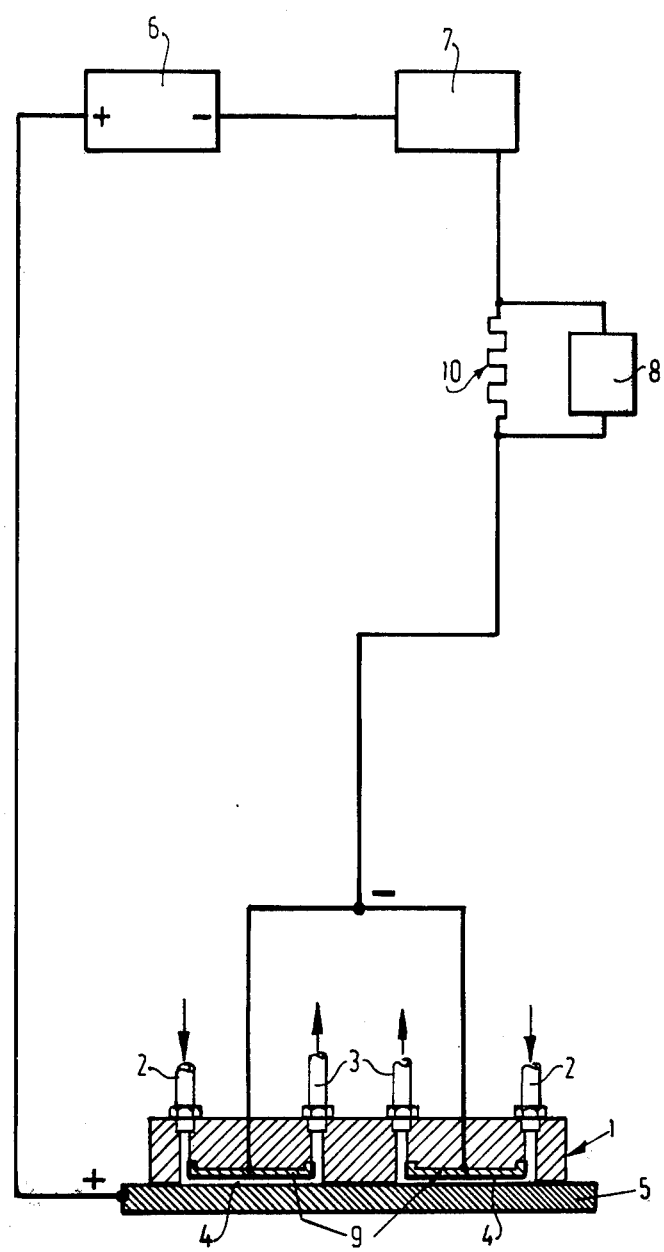

METHOD OF MACHINING ELECTRICALLY CONDUCTING SUBSTANCES BY ELECTROCHEMICAL ATTACK

The invention relates to a method of removing material from electrically conducting substances by electrochemical attack resulting from the passage of current between a workpiece of this material and an electrode during the afflux of electrolyte-containing liquid.

With the use of this methode, the charge of the material is almost always positive, while that of the electrode is negative.

The above method is used especially for the machining of so-called difficulty machinable materials and surfaces. An abbreviation for the method is E.C.M. (Electro Chemical Machining).

A detailed description of the E.C.M. process is given in the journal *Scientific American*, January 1974, pp. 30–37.

A drawback of the E.C.M. process is that the rate of flow of the electrolyte along the material to be machined must be high. The following is stated about this in the middle of page 35:

"Another reason for keeping the rate of flow high is to remove corrosion products from the gap. [Between workpiece and electrode]. If the electrolyte [-containing liquid] becomes contaminated with grains of metal or other substances, the rate of flow becomes uneven, the distribution of current becomes nonuniform and the surface finish is poor. To avoid this problem it is best to fit the flow line of the electrolyte with a filter."

It has been found in practice, however, that the use of a filter in the flow of electrolytic liquid which is recirculated in this case does not constitute a satisfactory solution. The corrosion products are indeed formed directly at the point where the electrochemical attack takes place, where they interfere with the process. This reduces the possibility of rapidly obtaining fine grooves in surfaces that are suitable for the assembly of bearings.

The invention aims at obviating the aforementioned drawback, so that the prior-art E.C.M. process unexpectedly receives a broader field of applications.

According to the invention, the passage of current is pulsed. Since the passage of current is pulsed, the corrosion products are washed away from the surface to be machined by the electrolyte-containing liquid during the interval that no passage of current takes place.

The surface finish is greatly improved by the pulsed feed of current, so that the E.C.M. method now becomes applicable for the removal of fairly small amounts of material. Surface deposits which could not be simply washed away used to be an impediment to the application of the E.C.M. method in producing fine grooves in workpieces of hard steel.

In the past, the E.C.M. method tended to be more suitable for removing larger amounts of material, where interference with the process by corrosion products was not serious. A further advantage is that the rate of afflux of the electrolyte may be less high. Use is preferably made of current pulses ranging from 5 to 20 milliseconds. The number of pulses from case to case is governed by the groove depth which is to be attained.

It is stated on pages 32 and 34, respectively, of the aforementioned publication in the journal *Scientific American* that a watery solution of sodium chlorate is used as electrolyte and that the distance between workpiece and electrode ranges from about 5 to 150 microns for removing relatively large amounts of material.

With the use of these known data, it is possible to obtain fine grooves by means of a pulsed passage of current, for example if the solution contains from 5 to 40 percent by weight of sodium chlorate and the applied voltage is comprised between 10 and 50 volts.

The amount of material removed and the groove depth related thereto can be controlled by integrating the current pulses applied.

It is possible to adjust the distance and the uniformity of the distance between the electrode and the workpiece by reversing the polarity of the electrode. During the passage of current, the electrode is then attacked, instead of the workpiece, causing the distance between the workpiece and the electrode to be increased. The electrode, which is normally negative, then becomes positive. It is to be noted that this adjustment involves very small distances and can only be satisfactorily performed with the use of pulsed passge of current. The removal of a small amount of material by the input of a very small amount of power can be better controlled by a pulsed current than is the case with a non-pulsed passage of current.

A method is known from Netherlands Patent Application No. 72-05,289 according to which a flow-guiding template is used in causing a liquid to flow along a workpiece at points determined by this template, the template being adapted in shape to the surface to be treated and being provided with channels for the afflux of liquid at the points where elongate recesses or grooves are desired in the workpiece.

This prior-art method deals with providing grooves by etching. The groove depth is here governed by the flow conditions in the afflux channels. A more deeply incised channel in the template itself and a higher flow velocity of the etching liquid along the workpiece then result in a deeper groove in the workpiece.

This known method can be improved, while preserving the exactness of the groove pattern to be obtained by etching, by providing one or more electrodes in the form of the desired recesses in the afflux channels that are embedded in the template. In this case, pulsed current is admitted between electrodes and workpiece. As a result of this improvement, groove patterns can be obtained much more rapidly than by this prior-art process.

Netherlands Patent Application No. 72-05,289 specifies templates of electrically nonconducting materials such as plastics or glass.

The afflux templates can be adapted both to flat and to curved surfaces. The flow in the afflux channels can be longitudinal as well as perpendicular as well as at an angle with respect to the surface to be machined. In the electrochemical attack of material in which grooves are to be formed, use is preferably made of a method where the liquid flow is directed along the workpiece and along the electrodes in the channels in the template, which direction of flow requires the lowest pressure for propelling the electrolyte and yields a product the quality of which can be particularly well controlled.

The aforedescribed method can be implemented in a very wide variety of manners. It is possible to use a point-shaped electrode with respect to which a flat or curved workpiece is moved during the attack. The curved surface can be constituted, for example, by a small round rod of metal which is rotated about its axis and at the same time performs a motion of translation in the direction of its axis. It is also possible to impart to steel spheres provided with a pivot a rotary motion with respect to a point-shaped electrode during the machining operation.

The invention can be implemented with an apparatus comprising some parts that are known from Netherlands Patent Application No. 72-05,289. This patent application specifies an apparatus comprising a flow-guiding template 1 which is provided with one or more liquid inlets 2, liquid outlets 3 and afflux channels 4 inside the template, the form of the template being adapted to a surface of the workpiece 5 which is to be machined. In implementing the method according to the invention, this prior-art apparatus is furthermore provided with a source of direct current 6, the positive pole of which is connected by way of a pulse generator 7 and a resister 10 — which resistor 10 is connected in parallel to a current integrator 8 — to electrodes 9 which are provided in the afflux channels 4 and are embedded in the flow-guiding template 1, while a positive pole of the source of direct current 6 can at the same time be connected to the workpiece 5.

Although the electrochemical method of removing material can be used for a wide variety of workpieces, it is preferably applied to surfaces which can be used in a bearing.

Without any restriction being intended, a description will be given hereinafter of the diagram of the FIGURE.

The FIGURE relates to a system for removing material where the flow of the electrolyte is parallel both to the workpiece and to the electrodes. In the FIGURE, the number 1 indicates a flow-guiding template which in this case is equipped with two liquid inlets 2, two liquid outlets 3 and two afflux channels 4 inside the template 1. The shape of the template 1 is adapted to the surface of a workpiece 5 which is to be machined. The afflux channels 4 contain two electrodes 9 which are embedded in the material of the template 1, which is here supposed to be electrically insulating. The electrodes 9 are connected to the negative pole of a source of direct current 6; the connection to the cource of direct current is established by way of a pulse generator 7, which only passes direct-current pulses of 5 to 20 milliseconds, and of a resistor 10. A current integrator 8, which collects and integrates the electric signal of the voltage drop along the resistor 10, is connected in parallel to the resistor 10. The integrator 8 serves for process control, since the total quantity of current applied is a measure for the amount of material removed. The workpiece 5 is connected to the positive pole of the source of direct current 6.

It is to be noted that the direction of flow of the Electrolyte does not have to be entirely parallel to the electrodes. The direction of flow can be at an angle to the electrodes when the position of the electrode is at an angle to the axis of symmetry of a curved surface which is to be machined, so that the direction of the afflux channels cannot be designed parallel or perpendicular to the electrode.

Such a case arises in the machining of a cylindrical or spherical pivot for a bearing.

As additional state of the art can be mentioned French patent 1,417,497 (Mitsubishi), French patent 2,166,760 (Centralec), French patent 1,280,813 (Agie), U.S. Pat. No. 3,371,022 (Kihoshi Inoue), French patent 1,526,671 (Associated Engineering) and French patent 1,565,759 (E. Pryor Developments).

However, from all these additional publications it was not obvious to derive a method for the very carefully etching of an intricate shallow groove pattern on the surface of an electrical conducting work piece such as e.g. a steel ball, wherein a non-conducting template provided with electrodes and pulsed current is used.

With respect to French patent 1,417,497 (Mitsubishi) there can be mentioned three important differences with the new method. First there are no real current pulses used, according to FIG. 16 a mechanical pulse supplier is used or according to FIGS. 4 and 9 a rectified 50 Hz current.

Nowhere in French patent 1,417,497 the length of the pulse time is given. For this reason this method cannot be applicated for the removal of very little amounts of material.

Secondly the afflux of liquid is caused through the electrode itself and not by means of a flow guiding template, which method has the possibility of carefully designing the liquid inlets and outlets. A template with carefully designed inlets and outlets for liquid is necessary for obtaining the required precision and equality of groove patterns required for technical purposes.

The last difference is the fact that reversing of the polarity according to the new method is effected only in order to adjust the distance between work piece and electrode. During the normal attacking process the electrode is not consumed.

According to French patent 2,166,760 (Centralec) an isolating mask is applied between the electrode and the work piece. This method is not suitable for the manufacture of very intricate surface groove patterns as the isolating mask described has no possibility for carefully designing the afflux canals for liquid.

In the French patent 1,280,813 (Agie) integration of the tension is applicated only in order to control the chemical attack itself of the work piece and not the total control of the manufacture of a groove pattern.

The process described in the U.S. Pat. No. 3,371,022 (Kihoshi Inoue) refers to a method for electro chemical machining, wherein greater amounts of materials are to be removed than the new method. Besides there are used two different kinds of liquids, because a liquid dielectric medium surrounds a liquid stream of electrolyte during the process. This method differs therefore wholly from the new process.

The resemblance between the new method and the method described in French patent 1,526,671 (Associated Engineering) is that the current of an electro chemical machining device is measured in order to determine the rate of electro chemical attack. Nowhere in this publication the fact is mentioned that electrodes in combination with an afflux template are used.

According to French patent 1,565,759 (E.Pryor Developments) a flow guiding template and an electrode are known. As the specific use is only the electrolytic marking of metallic subjects, it was not obvious to use this electrode and the flow guiding template with a pulsed direct current for the manufacture of intricate groove patterns.

I Claim:

1. A method of removing material from the surface of a workpiece made of an electrically conducting substance by electrochemical attack comprising:

providing a non-conducting template in association with the workpiece and flowing a liquid electrolyte into contact with the surface of the workpiece at at least one exposed place determined by the template, the template being adapted in shape to the surface from which material is to be removed and being provided with at least one elongated channel for the afflux of the liquid at the places where an elongated recess or groove is desired in the workpiece; and passing a direct current in pulses of 5–20 milliseconds between the exposed surface of the workpiece and at least one electrode which has the form of the desired recess and which is provided in the channel in the template.

2. A method as in claim 1 wherein the distance between the electrode and the surface of the workpiece is about 50–150 microns, wherein the electrolyte is an aqueous sodium chlorate solution containing 5–40% by weight sodium chlorate, and wherein the applied voltage is 10–50 volts.

3. A method as in claim 1 wherein the electrochemical attack is controlled by integration of the current pulses.

4. A method as in claim 1 wherein the distance and the uniformity of the distance between electrode and workpiece are adjusted by reversing the polarity of the electrode.

5. A method as in claim 1 wherein the electrolyte passes substantially parallel to the surface of the workpiece.

6. Work piece of electrically conducting material from which material is removed by electro chemical attack, characterized in that the electro chemical attack has taken place by pulsed passage of current according to claim 1, whereby one or more grooves are formed the grooves having a depth of 2 to 50 microns.

7. Work piece according to claim 6 characterized in that the electro chemical attack has taken place at a surface which can be used in a bearing, the said surface being provided with grooves having a depth of 2 to 50 microns.

* * * * *